United States Patent
Schweissthal et al.

(10) Patent No.: US 11,429,752 B2
(45) Date of Patent: Aug. 30, 2022

(54) METHOD FOR OPERATING A COMPUTER SYSTEM

(71) Applicant: SIEMENS MOBILITY GMBH, Munich (DE)

(72) Inventors: Hans-Helmut Schweissthal, Wolfenbuettel (DE); Jan Philipp Steinbach, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 26 days.

(21) Appl. No.: 17/264,929

(22) PCT Filed: Jul. 2, 2019

(86) PCT No.: PCT/EP2019/067653
§ 371 (c)(1),
(2) Date: Feb. 1, 2021

(87) PCT Pub. No.: WO2020/025237
PCT Pub. Date: Feb. 6, 2020

(65) Prior Publication Data
US 2021/0240865 A1 Aug. 5, 2021

(30) Foreign Application Priority Data
Jul. 30, 2018 (DE) .......................... 102018212686.0

(51) Int. Cl.
*G06F 21/74* (2013.01)
*G06F 21/53* (2013.01)
*G06F 21/56* (2013.01)

(52) U.S. Cl.
CPC .............. *G06F 21/74* (2013.01); *G06F 21/53* (2013.01); *G06F 21/567* (2013.01)

(58) Field of Classification Search
CPC ......... G06F 21/74; G06F 21/53; G06F 21/567
See application file for complete search history.

(56) References Cited

U.S. PATENT DOCUMENTS

| 6,604,177 B1 | 8/2003 | Kondo et al. |
| 7,661,105 B2 * | 2/2010 | Watt ........................ G06F 21/74 |
| | | 713/193 |

(Continued)

FOREIGN PATENT DOCUMENTS

| DE | 102012011584 A1 | 12/2013 |
| WO | WO 2018033344 A1 | 2/2018 |

OTHER PUBLICATIONS

Koepernik Dr. J. et al.; Funktionale Sicherheit in der Entwicklung von Fahrwerks und Fahrerassistenz-Systemen: Fokus Systemarchitektur; pp. 1-15; Vecter Congress Stuttgart; 2008; EN: Functional safety in the development of chassis and driver assistance systems, focusing on system architecture.

(Continued)

*Primary Examiner* — Viral S Lakhia
(74) *Attorney, Agent, or Firm* — Laurence A. Greenberg; Werner H. Sterner; Ralph E. Locher

(57) ABSTRACT

A method for operating a computer system including identical first and second processors operated in parallel and having at least two processor cores each, includes operating one processor core of each processor securely based on a secure operating system achieving or exceeding a specified security level, each executing at least one application program securely by achieving the specified security level. The processor cores securely execute the same application program or programs. Remaining processor cores of the first processor are switched off or operated securely, based on the secure operating system or one or more other secure operating systems under the secure execution of the same and/or other application programs. At least one processor core in the second processor is operated nonsecurely based on a nonsecure operating system not achieving the specified (Continued)

security level and executes at least one application program nonsecurely, falling short of the specified security level.

14 Claims, 3 Drawing Sheets

(56) References Cited

U.S. PATENT DOCUMENTS

| | | | |
|---|---|---|---|
| 9,094,210 B2* | 7/2015 | Frost | H04L 63/0281 |
| 9,268,606 B2 | 2/2016 | Mueller et al. | |
| 9,332,028 B2* | 5/2016 | Xaypanya | H04L 63/145 |
| 9,832,199 B2* | 11/2017 | Boivie | G06F 21/72 |
| 10,740,496 B2* | 8/2020 | Matveev | G06F 9/4405 |
| 10,983,847 B2* | 4/2021 | Drepper | G06F 9/4406 |
| 2008/0184258 A1 | 7/2008 | Toyama | |
| 2019/0188093 A1* | 6/2019 | Eckelmann-Wendt | G06F 11/1641 |
| 2020/0004952 A1* | 1/2020 | Rolin | G06F 21/565 |

OTHER PUBLICATIONS

Protected By Copyright! Do Not Publish!. EN50128, Safety related electronic systems for signalling technology.
Protected By Copyright! Do Not Publish!, EN50129, Safety related electronic systems for signalling technology.

* cited by examiner

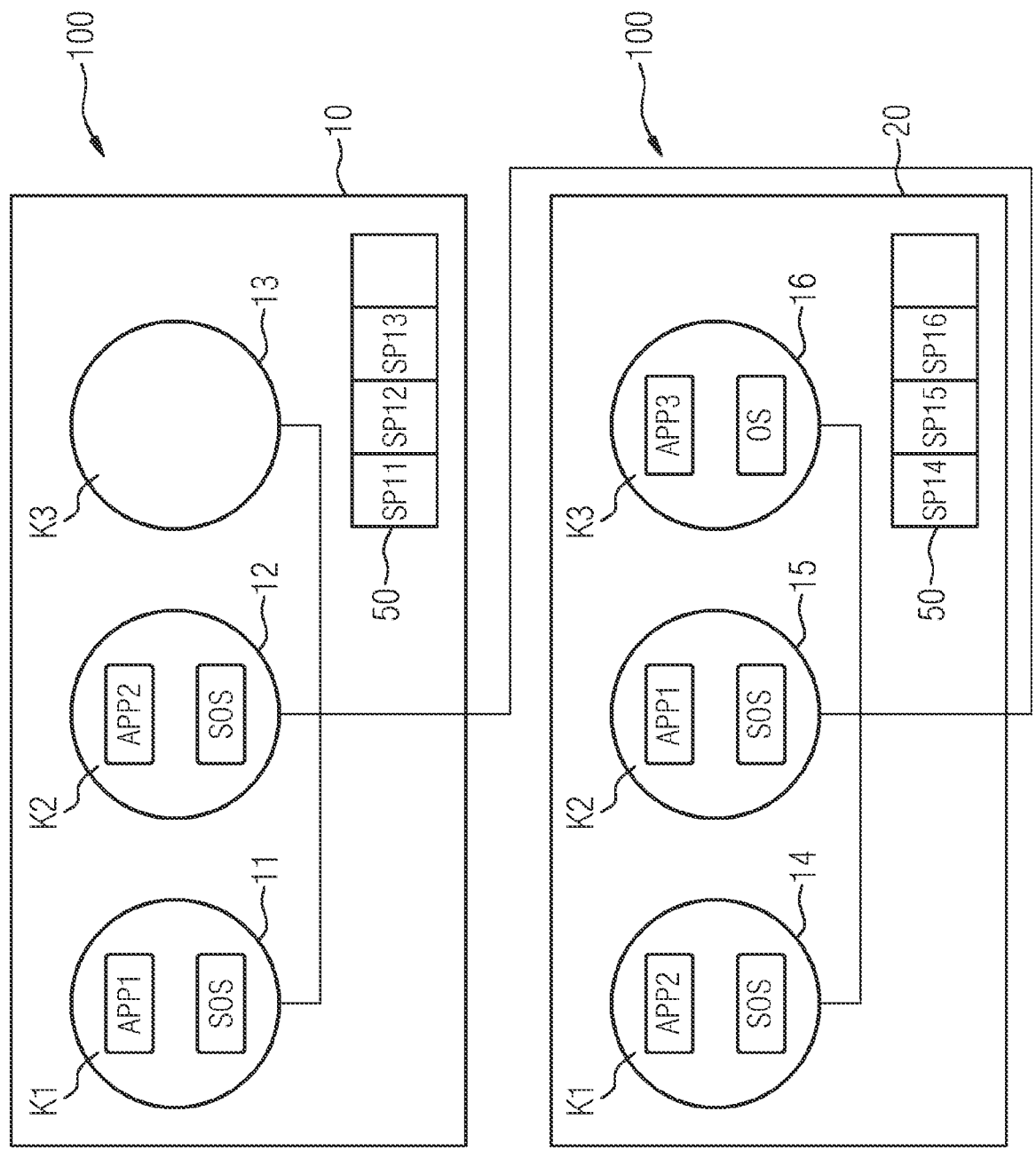

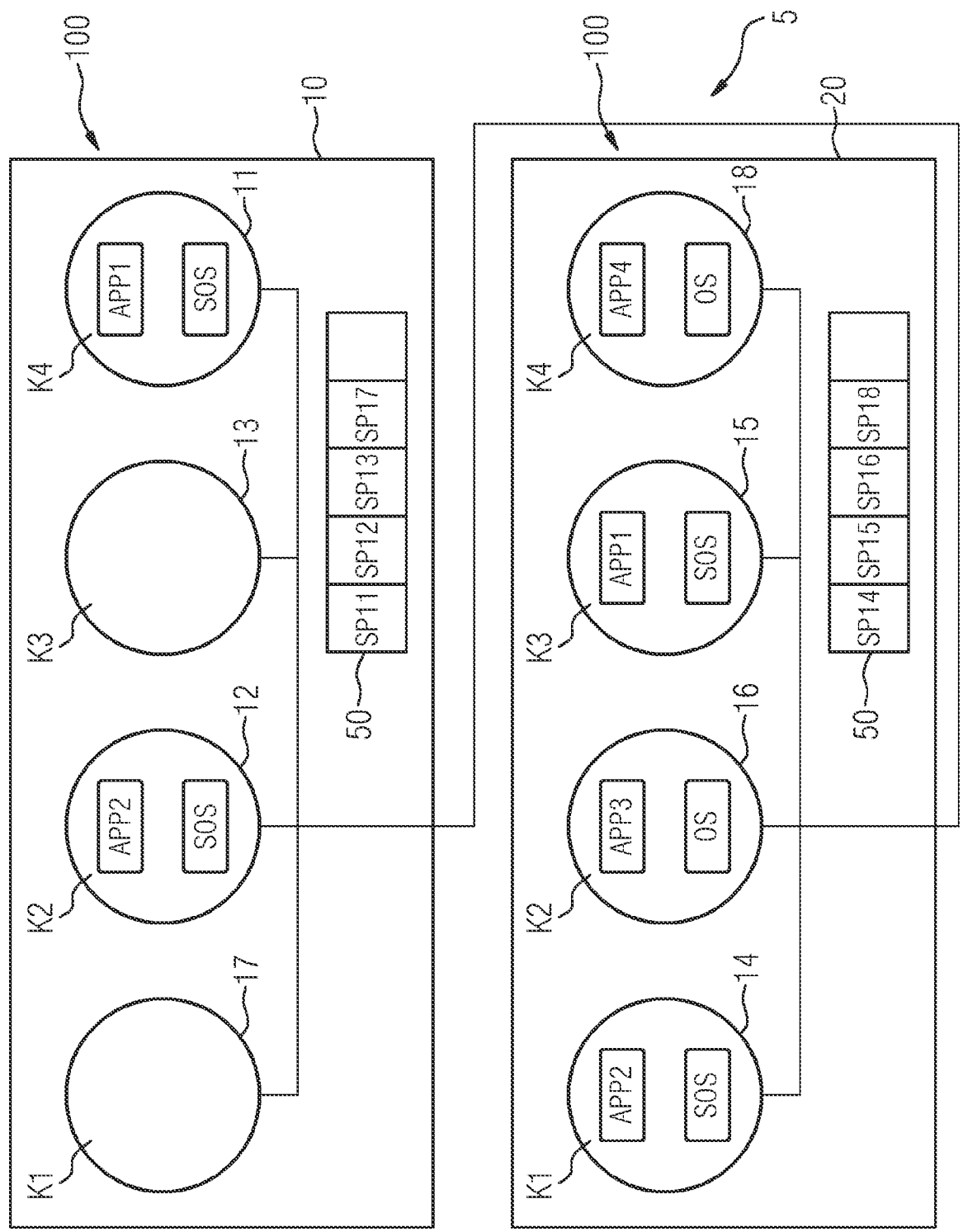

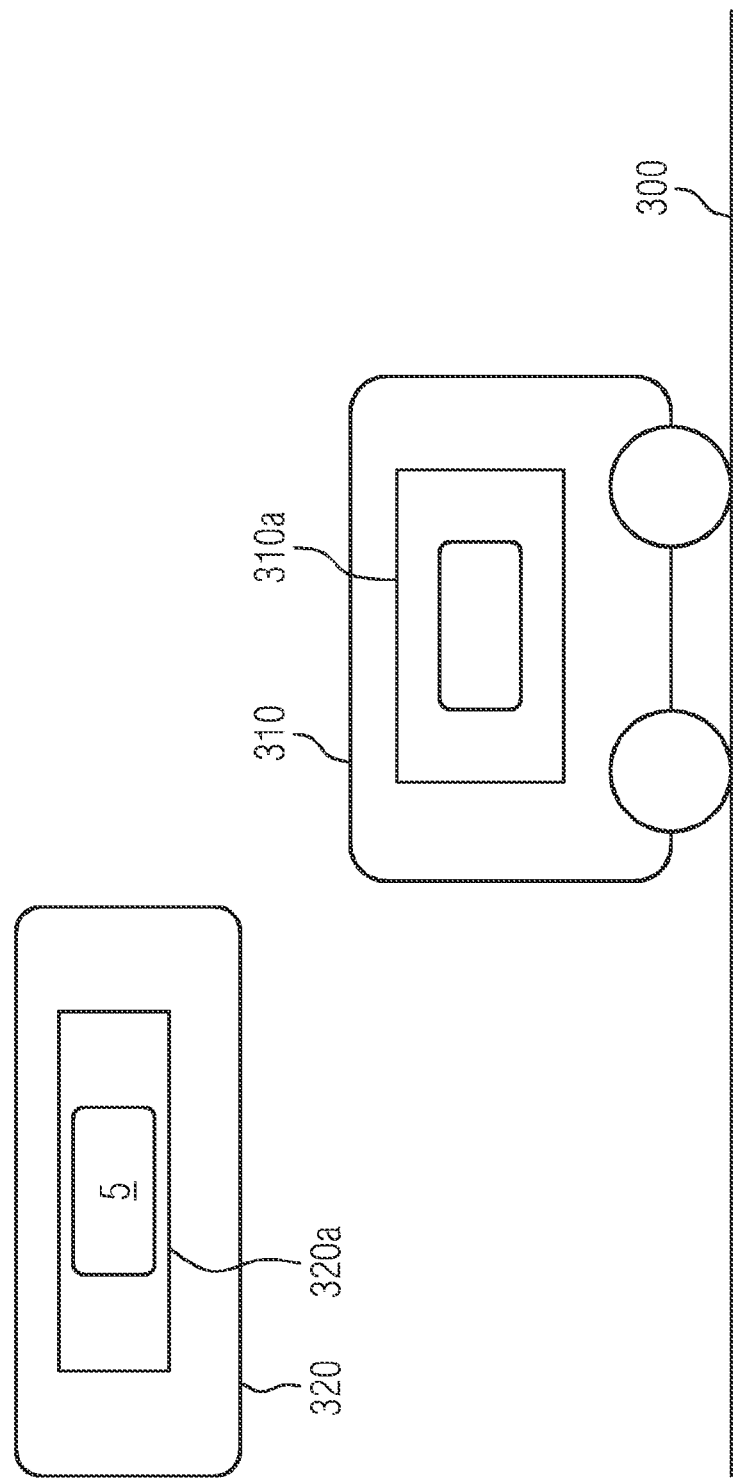

METHOD FOR OPERATING A COMPUTER SYSTEM

BACKGROUND OF THE INVENTION

Field of the Invention

The invention relates to a method for operating a computer system which has at least two processors operated in parallel.

Computer systems with processors operated in parallel are used, in particular, for controlling and monitoring those technical systems in which particularly secure system operation must be ensured, as is the case, for example, in the railway sector. For the railway sector, for example, the standards EN50128 and EN50129 are to be mentioned as relevant here.

SUMMARY OF THE INVENTION

The object of the invention is to provide a method for operating a computer system which can be carried out particularly securely and thereby also enables the execution of non-secure application programs.

This object is achieved according to the invention by a method with the steps described below. Advantageous embodiments of the method according to the invention are specified in subclaims.

According to the invention, a first and a second processor of the computer system are identical and each have at least two processor cores, with one processor core of the first processor and one processor core of the second processor each being operated securely, that is to say on the basis of a secure operating system which achieves or exceeds a specified security level, and each executing at least one application program securely, that is to say achieving the specified security level, wherein said processor core in the first processor and said processor core in the second processor each execute the same application program or the same application programs securely, wherein the remaining processor cores of the first processor are either switched off or are likewise being operated securely, whether on the basis of said secure operating system or of one or a plurality of other secure operating systems and under the secure execution of the same application programs and/or other application programs, wherein at least one processor core in the second processor is being operated non-securely, that is to say on the basis of a non-secure operating system which does not achieve the specified security level and is executing at least one application program non-securely, that is to say falling short of the specified security level.

A significant advantage of the method according to the invention is that errors which are generated by a non-securely operated application program can be very easily detected. As non-secure application programs are simply not operated in the first processor, they cannot cause any errors there either; in the case of two processors, errors in non-secure application programs or non-secure operating systems can at most occur in the second processor and thus be easily detected, for example, by comparing the modes of operation of the two processors. The same applies in the case of more than two processors as, according to the invention, at least the first processor is operated exclusively securely and a comparison with its mode of operation is thus always possible.

It is regarded as advantageous if the memory contents of said two identically operated processor cores are compared and a faulty reaction of the non-securely operated processor core of the second processor to the securely operated processor core of the second processor is concluded if the memory contents differ from one another in whole or in part, in particular with regard to operating data of the secure application program, in the case of the two securely operated processor cores or differ from one another beyond a specified extent.

In a variant regarded as particularly advantageous, it is provided that the first processor of the computer system has at least three processor cores of which a selected first processor core is operated with a secure operating system, that is to say an operating system which achieves or exceeds a specified security level, and executes a first application program securely, that is to say achieves the specified security level, a selected second processor core is operated with that secure operating system or another secure operating system and executes a second application program securely, and a selected third processor core is switched off.

The second processor likewise preferably has at least three processor cores, hereinafter referred to as fourth, fifth and sixth processor core, of which the fourth processor core is operated with the same secure operating system as the second processor core and executes the second application program securely, the fifth processor core is operated with the same secure operating system as the first processor core and executes the first application program securely, and the sixth processor core is operated with a non-secure operating system, that is to say an operating system that does not achieve the specified security level, and executes a third application program non-securely, that is to say falling short of the specified security level.

With regard to the two latter embodiments, it is considered advantageous if, relative to the processor structure, the fifth processor core is a different processor core from the first processor core in the first processor and is located elsewhere within the second processor from the first processor core in the first processor and, relative to the processor structure, the fourth processor core is a different processor core from the second processor core in the first processor and is located elsewhere within the second processor from the second processor core in the first processor.

As a result of such a different assignment of the processor cores or the application programs to the processor structure of the processors, hardware errors or hardware discrepancies of the processors can be easily detected.

It is advantageous if the working results of the securely operated application program or application programs of the first processor are compared with the working results of the corresponding securely operated application program or application programs of the second processor and a warning signal is generated if the working results differ or differ from one another beyond a specified extent.

Alternatively or additionally, it is advantageous if the memory contents of the first and fifth processor core and the memory contents of the second and fourth processor core are compared with one another and a faulty reaction of the non-securely operated processor core of the second processor to the securely operated processor cores of the second processor is concluded, if the memory contents differ from one another in whole or in part, in particular with regard to operating data of the secure application programs, or differ from one another beyond a specified extent.

In a further variant regarded as advantageous, it is provided that at least one processor core of the first processor is switched off and at least one processor core of the first processor is operated, wherein all the operated processor cores of the first processor are only operated securely, each operated processor core of the first processor is assigned precisely one processor core of the second processor respectively, which processor core operates with the same secure operating system as the assigned processor core of the first processor and executes the same application program or the same application programs as the assigned processor core of the first processor, and at least one processor core in the second processor is operated with a non-secure operating system, that is to say an operating system which does not achieve the specified security level and executes an application program non-securely, that is to say falling short of the specified security level.

Relative to the processor structure, the securely operated processor cores of the second processor are preferably located spatially elsewhere within the second processor to the assigned processor cores in the first processor.

The computer system is preferably used to operate a component of a technical system, in particular a rail-vehicle-side component of a rail vehicle or a trackside component, in particular a control center or signal box.

Furthermore, the invention relates to a computer system with at least two processors operated in parallel.

According to the invention, with regard to such a computer system it is provided that a first and a second processor of the computer system are identical and each have at least two processor cores, one processor core of the first processor and one processor core of the second processor each being operated securely, that is to say on the basis of a secure operating system which achieves or exceeds a specified security level, and each executing at least one application program securely, that is to say achieving the specified security level, wherein said processor core of the first processor and said processor core of the second processor each execute the same application program or the same application programs, wherein the remaining processor cores of the first processor are either switched off or are likewise being operated securely, whether on the basis of said secure operating system or of one or a plurality of other secure operating systems and under the secure execution of the same application programs and/or other application programs, and wherein at least one processor core is operated non-securely in the second processor, that is to say on the basis of a non-secure operating system which does not achieve the specified security level, and is executing at least one application program non-securely, that is to say falling short of the specified security level.

With regard to the advantages of the computer system according to the invention, reference is made to the above statements in connection with the method according to the invention.

The computer system preferably has a comparison facility which compares memory contents of said identically operated processor cores with one another and concludes a faulty reaction of the non-securely operated processor core to the securely operated processor core of the second processor if the memory contents differ from one another in whole or in part, in particular with regard to operating data of the secure application program, in the two securely operated processor cores or differ from one another beyond a specified extent.

The first processor of the computer system preferably has at least three processor cores, a selected first processor core being operated with a secure operating system, that is to say an operating system which achieves or exceeds a specified security level, and executing a first application program securely, that is to say achieving the specified security level, a selected second processor core being operated with that secure operating system or another secure operating system and executing a second application program securely, and a selected third processor core being switched off.

The second processor of the computer system likewise preferably has at least three processor cores, hereinafter referred to as fourth, fifth and sixth processor core, the fourth processor core being operated with the same secure operating system as the second processor core and executing the second application program securely, the fifth processor core being operated with the same secure operating system as the first processor core and executing the first application program securely, the sixth processor core being operated with a non-secure operating system, that is to say an operating system which does not achieve the specified security level, and executing a third application program non-securely, that is to say falling short of the specified security level.

Relative to the processor structure, the fourth processor core is preferably a different processor core from the second processor core in the first processor and is located elsewhere within the second processor from the second processor core in the first processor.

Relative to the processor structure, the fifth processor core is preferably a different processor core from the first processor core in the first processor and is located elsewhere within the second processor from the first processor core in the first processor.

It is regarded as particularly advantageous if at least one processor core of the first processor is switched off and at least one processor core of the first processor is operated, wherein all the operated processor cores of the first processor are only operated securely, each operated processor core of the first processor is assigned precisely one processor core of the second processor respectively, which processor core is operated identically, that is to say operates using the same secure operating system as the assigned processor core of the first processor and executes the same application program or application programs as the assigned processor core of the first processor, at least one processor core in the second processor is operated with a non-secure operating system, that is to say an operating system which does not achieve the specified security level, and executes at least one application program non-securely, that is to say falling short of the specified security level, and the securely operated processor cores of the second processor—relative to the processor structure—are spatially located elsewhere within the second processor from the assigned processor cores in the first processor.

The invention also relates to a component for a technical system. According to the invention, this is equipped with a computer system as described above.

It is advantageous if the component is a vehicle-side component, in particular a control device of a vehicle, preferably of a rail vehicle, or the component is a trackside component, in particular a control center computer of a control center of a railway track system or a signal box computer of a signal box of a railway track system.

The invention is explained in more detail hereinafter with reference to exemplary embodiments.

BRIEF DESCRIPTION OF THE SEVERAL VIEWS OF THE DRAWING

FIG. 1 An exemplary embodiment of a computer system according to the invention, in which two processors each have three processor cores, wherein an exemplary embodiment of the method according to the invention is explained with reference to the exemplary embodiment according to FIG. 1, FIG. 2 A further exemplary embodiment of a computer system according to the invention, in which two processors each have four processor cores, wherein a further exemplary embodiment of the method according to the invention is explained with reference to the exemplary embodiment according to FIG. 2, and FIG. 3 An exemplary embodiment of a railway track system and an exemplary embodiment of a rail vehicle equipped with computer systems according to the invention.

DETAILED DESCRIPTION OF THE INVENTION

For the sake of clarity, the same reference characters are always used for identical or comparable components in the figures.

FIG. 1 shows a computer system 5 comprising six processor cores, namely a first processor core 11, a second processor core 12, a third processor core 13, a fourth processor core 14, a fifth processor core 15 and a sixth processor core 16.

The three processor cores 11, 12 and 13 are located in a first processor 10 of the computer system 5 and the processor cores 14, 15 and 16 are located in a second processor 20 of the computer system 5.

The two processors 10 and 20 are identical and each have a semiconductor chip 100. The semiconductor chips 100 comprise chip sections K1, K2 and K3, in each of which a processor core is arranged.

In the exemplary embodiment according to FIG. 1, the chip section K1 is located at the same point—relative to the processor structure and relative to the semiconductor chip 100—as the chip section K1 in the second processor 20. In a corresponding manner, the chip sections K2 and K3 in the semiconductor chip 100 of the first processor 10 are in each case located at the same point as the corresponding chip sections K2 and K3 in the semiconductor chip 100 of the second processor 20.

The two processors 10 and 20 each execute a first application program APP1 and a second application program APP2 securely using a secure operating system SOS. The "secure" execution of an application program is here understood to mean, by way of example, an application program which complies with the standards EN50128 and EN50129. "Secure" operating systems SOS are here likewise understood to mean, by way of example, those operating systems which comply with the standards EN50128 and EN50129.

The application programs APP1 and APP2 are executed in the two processors 10 and 20 in different chip sections or in various processor cores. Thus, it can be seen in FIG. 1 that the first application program APP1 is executed in the first processor core 11, here that is to say in the first chip section K1 of the first processor, while the first application program APP1 is executed in the second processor 20 of the fifth processor core 15, here that is to say in the second chip section K2. The first application program APP1 is therefore executed in different chip sections K1 and K2 of the semiconductor chips 100 of the two processors 10 and 20.

In a corresponding manner, the second application program APP2 is also executed in different chip sections. It can thus be seen that the second application program APP2 is executed by the first processor 10 in the second chip section K2 and thus by the second processor core 12; the second application program APP2 is executed by the second processor 20 in the first chip section K1 and thus by the fourth processor core 14.

By executing the application programs APP1 and APP2 in different chip sections K1 and K2 of the processors 10 and 20 in each case, it is possible for any hardware errors or hardware discrepancies in the semiconductor chips 100 to be easily detected, for example, by comparing working results and/or memory contents of the application programs APP1 and APP2 across processors.

FIG. 1 also shows that the second processor 20 has a non-secure application program APP 3 executed in its chip section K3, that is to say by the sixth processor core 16, using a non-secure operating system OS. Such a non-secure application program APP3 is not executed by the first processor 10; the third chip section K3 is therefore not operated by the first processor 10 and is securely switched off.

By virtue of the division of labor provided in the two processors 10 and 20 in such a way that the first processor 10 is only operated with secure application programs APP1 and APP2 and non-secure application programs, here APP3, are only permitted in the second processor 20, it is possible for any error to be determined in a simple manner by the non-secure application program APP3 or also by the non-secure operating system OS. If the operation of the non-secure application program APP3 in the second processor 20 is faulty and influences the mode of operation of the securely operated processor cores 14 and 15, this can be established by a comparison of the memory contents and/or the working results of the securely operated processor cores 14 and 15 of the second processor 20 with the memory contents and/or working results of the securely operated processor cores 12 and 11 of the solely securely operated first processor 10.

In the exemplary embodiment according to FIG. 1, each processor 10 is in each case assigned a memory 50 which can be integrated in the respective semiconductor chip 100 of the respective processor 10 or 20 or, alternatively, can be formed by a separate component which is assigned to the respective semiconductor chip 100 or the respective processor.

The two memories 50 of the two processors 10 and 20 each have memory areas which are individually assigned to processor cores. Thus, the memory area SP11 of the memory 50 of the first processor 10 is assigned to the first processor core 11 and thereby to the chip section K1 of the first processor 10; the memory areas SP12 and SP13 are assigned to the second processor core 12 or the third processor core 13.

In a corresponding manner, memory areas SP14, SP15 and SP16 of the memory 50 in the second processor 20 are assigned to the fourth processor core 14, the fifth processor core 15 and the sixth processor core 16.

Working results of the application program of the respective processor core can in each case be stored in the memory areas SP11 to SP16, for example, operating data of a technical system which is controlled or managed by the application programs APP1 to APP3. If the technical system is, for example, a railway track system (see FIG. 3), corresponding operating data relating to railway technology, for example, occupied indications, release information, train numbers, train speeds, timetable data, etc. can be stored as memory contents in the memory areas SP11 to SP16.

It is advantageous if the computer system 5 has a comparison facility which enables a comparison of the memory contents of the memory areas. Such a comparison facility can, for example, compare the memory contents of the memory area SP11, which is assigned to the first processor core 11 and thereby to the first application program APP1, with the memory area SP15, which is assigned to the fifth processor core 15 and thereby likewise to the first application program APP1 in the second processor 20, and in the event of a discrepancy between the memory contents, output a warning or error signal.

In a corresponding manner, such a comparison facility can compare the memory contents SP12 and SP14 with one another, in which the working results, for example, operating data, of the second application program APP2 are stored in the two processors 10 and 20.

Such a comparison facility can be implemented by a separate hardware component or by a comparison functionality implemented by means of software which is executed by the securely operated processor cores themselves.

In summary, in the exemplary embodiment according to FIG. 1, an error disclosure of a faulty mode of operation of the non-secure application program APP3 is possible in a very simple way if the latter produces a faulty reaction in the securely operated application programs APP1 and APP2 in the second processor 20 because such a faulty reaction can be detected namely through a comparison with the working results and the mode of operation of the corresponding securely operated application programs APP1 and APP2 of the first processor 10. The error disclosure is based specifically on the idea that in the first processor 10 the processor cores are either operated securely or not at all, and non-secure application programs are only permitted in the second processor 20 so that errors of non-secure application programs simply cannot occur in the first processor 10.

The assignment of the first processor core 11, which executes the first application program APP1, to the chip section K1 of the first processor 10, the assignment of the second processor core 12, which executes the second application program APP2, to the chip section K2 of the first processor 10, the assignment of the fourth processor core 14, which executes the second application program APP2, to the chip section K1 of the second processor 20 and the assignment of the fifth processor core 15, which executes the first application program APP1, to the chip section K2 of the second processor 20 are to be understood here only by way of example; said processor cores or application programs can also be assigned to other chip sections and be differently distributed on the semiconductor chips; this is to be explained by way of example hereinafter with reference to FIG. 2.

FIG. 2 shows a second exemplary embodiment of a computer system 5 which is equipped with two processors 10 and 20. Unlike the exemplary embodiment according to FIG. 1, each of the processors 10 and 20 has four processor cores respectively, that is to say two more than in the exemplary embodiment according to FIG. 1. The two additional processor cores are indicated by the reference characters 17 and 18 in FIG. 2.

The second processor 20 is operated with two non-secure application programs APP3 and APP4 which are executed in the processor cores 16 and 18. Accordingly, two of the processor cores, for example, the processor cores 13 and 17, remain unused in the first processor 10.

Assignment to the chip sections is as follows in FIG. 2, for example: The so-called first processor core 11, which executes the first application program APP1, is assigned to the chip section K4 of the first processor 10, the so-called second processor core 12, which executes the second application program APP2, is assigned to the chip section K2 of the first processor 10, the so-called fourth processor core 14, which executes the second application program APP2, is assigned to the chip section K1 of the second processor 20 and the so-called fifth processor core 15, which executes the first application program APP1, is assigned to the chip section K3 of the second processor 20. The non-secure application programs APP3 and APP4 run in the chip sections K2 and K4 of the second processor 20.

Otherwise, the above explanations apply accordingly in connection with FIG. 1.

FIG. 3 shows an exemplary embodiment of a railway track system 300 on which a rail vehicle 310 is traveling.

The rail vehicle 310 has a control device 310a comprising a computer system 5 according to FIGS. 1 and 2.

The railway track system 300 comprises a trackside component in the form of a signal box computer 320a of a signal box 320. The signal box computer 320a has a computer system 5 according to FIGS. 1 and 2.

With regard to the mode of operation of the control device 310a and the signal box computer 320a, reference is made to the above embodiments in connection with the computer system 5 according to FIGS. 1 and 2.

Although the invention has been illustrated and described in more detail by means of preferred exemplary embodiments, the invention is not limited by the disclosed examples, and other variations may be derived therefrom by a person skilled in the art without departing from the scope of the invention.

The invention claimed is:

1. A method for operating a computer system, the method comprising:
   providing the computer system with at least first and second identical processors being operated in parallel
   providing the first processor of the computer system with at least first, second and third selected processor cores, and providing the second processor of the computer system with at least fourth, fifth and sixth processor cores;
   securely operating the first selected processor core with a secure operating system achieving or exceeding a specified security level and securely executing a first application program by achieving the specified security level;
   operating the second selected processor core with the secure operating system or another secure operating system and securely executing a second application program; and
   switching off the third selected processor core;
   securely operating the fourth processor core with a secure operating system identical to the second processor core and securely executing the second application program;
   operating the fifth processor core with a secure operating system identical to the first processor core and securely executing the first application program; and
   non-securely operating the sixth processor core with a non-secure operating system not achieving the specified security level and non-securely executing at least one application program by falling short of the specified security level.

2. The method according to claim 1, which further comprises comparing memory contents of the two identically operated processor cores and concluding a faulty reaction of the non-securely operated processor core of the second processor to the securely operated processor core of the second processor when the memory contents differ from one another in whole or in part or with regard to operating data of the secure application program, in the two securely operated processor cores or differ from one another beyond a specified extent.

3. The method according to claim 1, which further comprises:
relative to a processor structure, providing the fifth processor core as a different processor core than the first processor core in the first processor and locating the fifth processor core elsewhere within the second processor from the first processor core in the first processor; and
relative to the processor structure, providing the fourth processor core as a different processor core than the second processor core in the first processor and locating the fourth processor core elsewhere within the second processor from the second processor core in the first processor.

4. The method according to claim 1, which further comprises comparing working results of the securely operated application program or application programs of the first processor with working results of a corresponding securely operated application program or application programs of the second processor, and generating a warning signal when the working results differ or differ from one another beyond a specified extent.

5. The method according to claim 1, which further comprises comparing memory contents of the first and fifth processor cores and memory contents of the second and fourth processor cores with one another and concluding a faulty reaction of the non-securely operated processor core of the second processor to the securely operated processor cores of the second processor when the memory contents differ from one another in whole or in part or with regard to operating data of the secure application programs, or differ from one another beyond a specified extent.

6. The method according to claim 1, which further comprises:
switching off at least one processor core of the first processor and operating at least one processor core of the first processor, and only securely operating all of the operated processor cores of the first processor;
assigning each operated processor core of the first processor to precisely one processor core of the second processor operating with a secure operating system identical to the assigned processor core of the first processor and executing an application program or application programs identical to the assigned processor core of the first processor; and
operating at least one processor core in the second processor with a non-secure operating system not achieving the specified security level, and non-securely executing an application program falling short of the specified security level.

7. The method according to claim 6, which further comprises relative to a processor structure, spatially locating the securely operated processor cores of the second processor elsewhere within the second processor from the assigned processor cores in the first processor.

8. The method according to claim 1, which further comprises using the computer system to operate a technical system or a rail-vehicle-side component of a rail vehicle or a trackside component or a control center or signal box.

9. A computer system, comprising:
at least first and second identical processors being operated in parallel, the first processor having at least first, second and third selected processor cores, and the second processor having at least fourth, fifth and sixth processor cores;
the first selected processor core being operated securely based on a secure operating system achieving or exceeding a specified security level and each securely executing at least one application program achieving the specified security level;
the second selected processor core being operated with the secure operating system or another secure operating system and securely executing a second application program;
third selected processor core being switched off;
the fourth processor core being operated with a secure operating system identical to the second processor core and securely executing the second application program;
the fifth processor core being operated with a secure operating system identical to the first processor core and securely executing the first application program; and
the sixth processor core being non-securely operated based on a non-secure operating system not achieving the specified security level and non-securely executing at least one application program falling short of the specified security level.

10. The computer system according to claim 9, which further comprises a comparison facility comparing memory contents of said identically operated processor cores with one another and concluding a faulty reaction of said non-securely operated processor core to said securely operated processor core of said second processor when said memory contents differ from one another in whole or in part or with regard to operating data of said secure application program, in said two securely operated processor cores or differ beyond a specified extent.

11. The computer system according to claim 9, wherein:
relative to a processor structure, said fourth processor core is a different processor core than said second processor core in said first processor and is located elsewhere within said second processor from said second processor core in said first processor; and
relative to said processor structure, said fifth processor core is a different processor core than said first processor core in said first processor and is located elsewhere within said second processor from said first processor core in said first processor.

12. The computer system according to claim 9, wherein:
at least one of said processor cores of said first processor is switched off and at least one of said processor cores of said first processor is operated, and all of said operated processor cores of said first processor are only operated securely;
each operated processor core of said first processor is assigned precisely one respective processor core of said second processor being operated identically with a secure operating system identical to said assigned processor core of said first processor and executes an application program or application programs identical to said assigned processor core of said first processor;
at least one of said processor cores in said second processor is operated with a non-secure operating system not achieving the specified security level and non-securely executes at least one application program falling short of the specified security level; and
relative to the processor structure, said securely operated processor cores of said second processor are spatially located elsewhere within said second processor from said assigned processor cores in said first processor.

13. A component for a technical system, the component comprising a computer system according to claim 9.

14. The component according to claim 13, wherein:
the component is a vehicle-side component or a control device of a vehicle or of a rail vehicle, or
the component is a trackside component or a control center computer of a control center of a railway track system or a signal box computer of a signal box of a railway track system.

* * * * *